United States Patent [19]

Kloots et al.

[11] Patent Number: 4,534,617

[45] Date of Patent: Aug. 13, 1985

[54] FIBEROPTIC CABLE ASSEMBLIES

[75] Inventors: Jacobus Kloots, Sturbridge; John Marengo, Cherry Valley, both of Mass.

[73] Assignee: Luxtec Corporation, Sturbridge, Mass.

[21] Appl. No.: 507,062

[22] Filed: Jun. 23, 1983

[51] Int. Cl.³ .................................. G02B 7/26
[52] U.S. Cl. .................. 350/96.20; 350/96.22
[58] Field of Search ............... 350/96.20, 96.21, 96.22

[56] References Cited

U.S. PATENT DOCUMENTS

| Re. 31,515 | 2/1984 | Heldt | 350/96.21 |
| 4,073,050 | 2/1978 | Kloots | 350/96.20 X |
| 4,114,979 | 9/1978 | Heldt | 350/96.21 |
| 4,148,557 | 4/1979 | Garvey | 350/96.20 |
| 4,264,129 | 4/1981 | Warkentine | 350/96.22 |
| 4,336,977 | 6/1982 | Monaghan et al. | 350/96.20 |
| 4,398,793 | 8/1983 | Ohta et al. | 350/96.20 |

FOREIGN PATENT DOCUMENTS 1229748  8/1964  Fed. Rep. of Germany ... 350/96.20

*Primary Examiner*—William L. Sikes
*Assistant Examiner*—Frank González
*Attorney, Agent, or Firm*—Thomas N. Tarrant

[57] ABSTRACT

A fiberoptic cable assembly is described with terminal connectors in which a coupling element encloses the fiberoptic fibers and has a sleeve portion over which the fiberoptic sheath is secured and a larger diameter hollow portion carrying discontinuities on its exterior surface for engaging a strain relief tubing. A cup washer is locked against the coupling element by a locking element that serves as the connecting terminal of the cable. The cup washer is designed so that its cupped portion encloses the end of the strain relief tubing and presses it into the discontinuities securing the tubing in place.

3 Claims, 4 Drawing Figures

FIBEROPTIC CABLE ASSEMBLIES

BACKGROUND OF THE INVENTION

1. Field of the Invention

The present invention relates to fiberoptic cable assemblies and in particular to the assembly of connectors at the ends of the cables for durability under hard usage.

2. Description of the Prior Art

Fiberoptic cable assemblies have been both expensive and fragile. To over come the fragility, terminal assemblies and connectors of a costly nature have been used. Special machining, extensive use of epoxies and other sophisticated bonding materials and multiple tapered resilient sheathes have been common. While the cost of the fiberoptics themselves has steadily decreased, the cost of the cable assemblies has remained high due to costly terminations. The cost of the terminations, however, cannot be reduced at the expense of reliability since failure of these assemblies in use is frequently more costly than the cables themselves.

SUMMARY OF THE INVENTION

In accordance with the present invention, it has been found that cup washers at the terminations of fiberoptic cables interacting with discontinuities in the exterior surface of a terminal coupling element can secure the leading edge of a resilient strain-relieving sleeve by compression action of the cup washer pinching the sleeve against the discontinuities. Further objects and features of the invention will become apparent upon reading the following description together with the Drawing.

DESCRIPTION OF THE PREFERRED EMBODIMENTS

Figure 1:
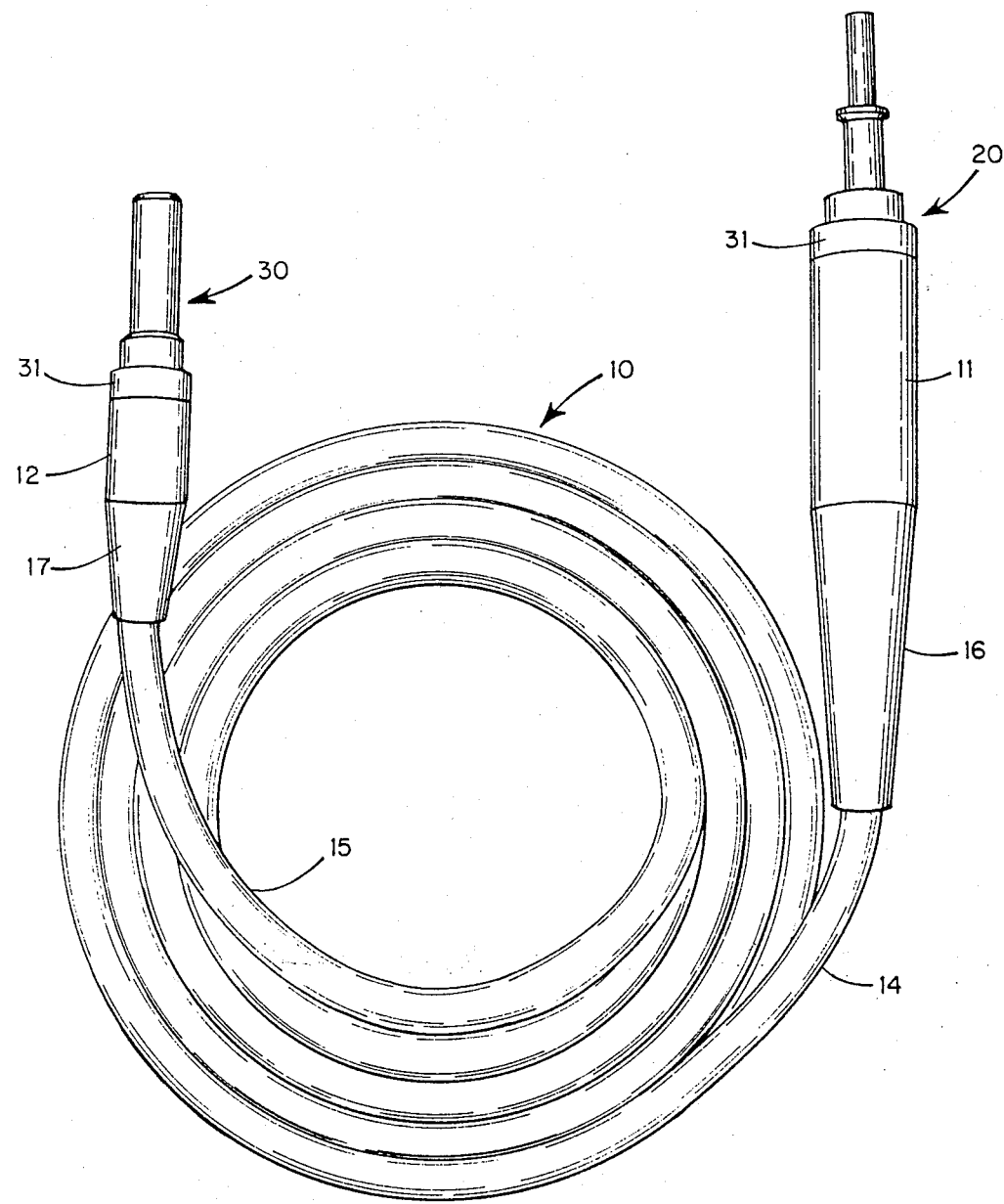
FIG. 1 is a projection of a fiberoptic cable assembly according to the invention.

A fiberoptic cable assembly, 10, is depicted in FIG. 1 with connector 20 on first end 11 and connector 30 on second end 12. Cable 14 consists of a large number of fiberoptic filaments encased in flexible sheath 15 suitably made of silicone latex tubing. Connectors 20 and 30 are rigid so that there is a maximum of stress at the junctures between cable 14 and connectors 20 and 30. To relieve the stress at these junctures, stress-relieving sleeves 16 and 17 of molded silicone latex are provided extending over portions of cable 14 and connectors 20 and 30. While sleeves 16 and 17 are depicted as smooth, is some cases it is preferable to have them convoluted. Among other features, convolutions can improve flexibility while still preventing sharp bends.

Figure 2:
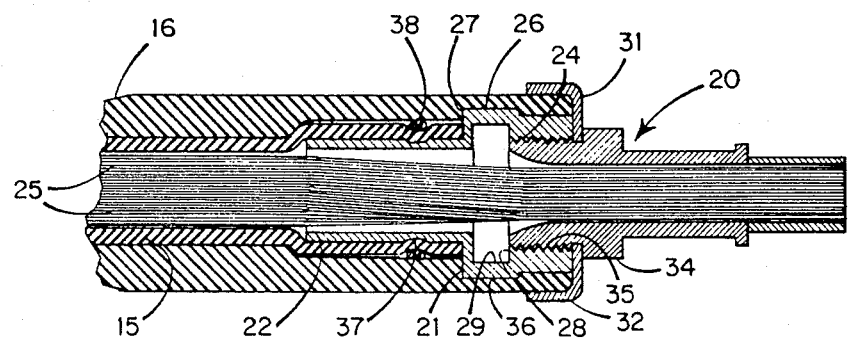
FIG. 2 is a cross-section of connector 20 in FIG. 1.
Figure 3:
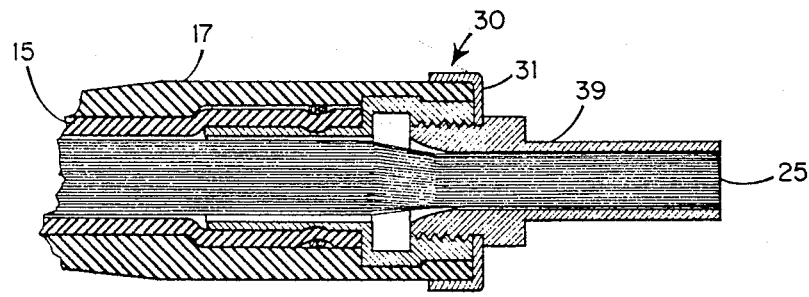
FIG. 3 is a cross-section of connector 30 in FIG. 1.

FIG. 2 shows a detail of connector 20 in cross-section. Rigid cylindrical coupling element 21 has sleeve portion 22 enclosing multiple optical fibers 25. Element 21 is suitably molded or cast from metal or plastic. Flexible sheath 15 is stretched outward by sleeve portion 22 to extend over the exterior of sleeve 22. A second enlarged hollow portion 26 of element 21 adjoins portion 22. Enlarged hollow portion 26 has discontinuity 27 in the form of a raised annular ridge on its exterior surface. Other types of discontinuities may be utilized.

Inner surface 28 of second portion 26 has an annular recess 29 opposite discontinuity 27. Extending from recess 29 the surface 28 is threaded with screw threads 24.

Cup washer 31 fits over second portion 26 with its cupped surface facing toward cable 14. Strain relief 16 extends over the length of coupling element 21 and under the cupped portion 32 of washer 31. Locking element 34 has threaded portion 35 mating with screw threads 24. Threaded portion 35 clamps against washer 31 when element 34 is threaded into screw threads 24 in element 21. This in turn forces cup washer 31 to engagingly compress strain relief 16 against discontinuity 27. Preferably, strain relief 16 has molded annular recess 36 matching annular ridge 27 so that the compressive action of washer 31 produces a positive locking action locking strain relief 16 securely in place.

In order to ensure that moisture cannot enter sheath 15, it is also preferable to form annular recess 37 in sleeve portion 22. A tight O-ring, 2 turns of stainless wire 38 or other annular clamping means compresses sheath 15 into recess 37 making a water tight seal.

Connector 30 is similar to connector 20 except that locking element 34 is replaced with shorter locking element 39. The connectors used with the invention can be adapted for most equipment sockets by selection of the appropriate locking element.

In assembly, since no complex molding process is involved, the fiberoptic cable is cut to the desired length and coupling elements 21 are fitted over optical fibers 25. Sheath 15 is pushed on over the outside of sleeve portion 22 and clamped with wire 38. Strain relief 16 is pushed into position so that recess 36 engages annular ridge 27. A length of optical fibers 25 extending through coupling element 21 is saturated with epoxy or other suitable resin and then both washer 31 and locking element 34 are installed. After the epoxy has cured, the portion of fibers 25 extending beyond locking element 34 is removed and the remaining end is polished to a high finish. The second end of the cable is handled in similar fashion.

Figure 4:
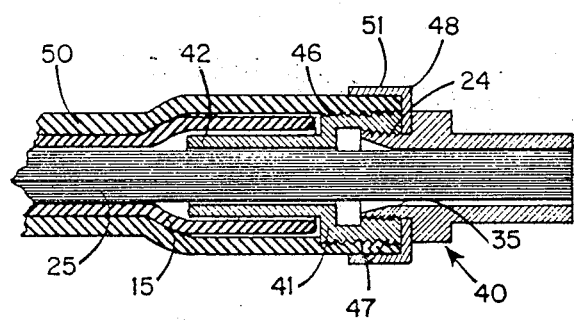
FIG. 4 is a cross-section of a further embodiment of a connector according to the invention.

Other types of discontinuities may be utilized to secure strain relief 16. FIG. 4 depicts connector 40 and uses the same reference numerals as connector 20 for the equivalent parts. As in FIG. 2, rigid cylindrical coupling element 41 has sleeve portion 42 enclosing multiple optical fibers 25. Flexible sheath 15 is stretched outward by sleeve portion 42 to extend over the exterior of sleeve portion 42. In connector 40, sheath 15 is shown held in place over sleeve portion 42 by friction. A bonding adhesive may also be used or a clamping means as shown in FIG. 2.

Second enlarged hollow portion 46 of element 41 adjoins portion 42. Enlarged hollow portion 46 has plurality of discontinuities 47 on its exterior surface. These discontinuities may take the form of a series of ridges as shown, a knurled surface or the like.

Cup washer 48 fits over second portion 46 with its cupped surface facing toward cable 14. Strain relief 50 extends over the length of coupling element 41 and under the cupped portion 51 of washer 48. Cupped portion 51 of washer 48 is bent sharper and extends further than in the case of washer 31 so as to compress a greater length of strain relief 50 against multiple discontinuities 47. This can be important when, as in this embodiment, there is no mating discontinuity molded into strain relief 50. Since the remainder of connector 40 is the same as connector 20, reference may be made to the description of connector 20 for the remaining details.

Since the invention has been described with reference to specific embodiments, it will be understood that variations within the state of the art are contemplated and it is the intention to cover the invention as set forth in the following claims.

We claim:

1. In a fiberoptic cable assembly having a length of multiple optical fibers, a flexible sheath enclosing said fibers and a connector at each end, the combination in at least one said connector comprising:
   a. a rigid cylindrical coupling element having a sleeve portion enclosing terminations of said multiple optical fibers and being itself enclosed by a termination of said sheath, and an enlarged hollow portion having an enlarged annular ridge portion on its exterior surface adjacent said sleeve portion for securing a strain reliever;
   b. a flexible resilient strain-relieving sleeve extending over said termination of said sheath and over said enlarged hollow portion; and,
   c. a cup washer secured to said hollow portion with its cupped face extending over said strain-relieving sleeve compressing it against said annular ridge portion, and said connector further comprising an annular recess about said sleeve portion and a constricting element about said sheath opposite said annular recess forcing said sheath into said recess, and still further comprising an inner molded annular recess in said strain-relieving sleeve mating with said enlarged annular ridge so as to lock said strain-relieving sleeve securely to said coupling element under the compressive force of said cup washer.

2. In a fiberoptic cable assembly having a length of multiple optical fibers, a flexible sheath enclosing said fibers and a connector at each end, the combination in at least one said connector comprising:
   a. a rigid cylindrical coupling element having a sleeve portion enclosing terminations of said multiple optical fibers and being itself enclosed by a termination of said sheath, and an enlarged hollow portion having at least one discontinuity on its exterior surface for securing a strain reliever;
   b. a flexible resilient strain-relieving sleeve extending over said termination of said sheath and over said enlarged hollow portion; and,
   c. a cup washer secured to said hollow portion with its cupped face extending over said strain-relieving sleeve compressing it against said at least one discontinuity, wherein said enlarged hollow portion has internal threads and further comprising a hollow cylindrical locking element having a first threaded portion mating with said threads and a second radially larger portion that clamps said cup washer against said cylindrical coupling element.

3. In a fiberoptic cable assembly according to claim 2, the combination wherein said at least one connector is two similar connectors, one at each end of said cable assembly.

* * * * *